March 4, 1941. G. A. TINNERMAN 2,234,097
ATTACHING KNOBS, HANDLES, AND THE LIKE
Filed Sept. 21, 1938
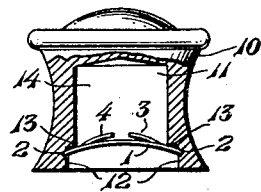
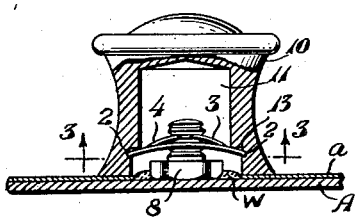
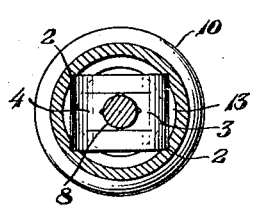
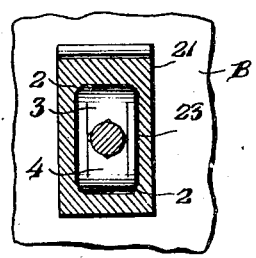
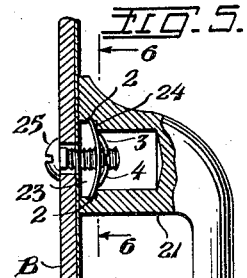
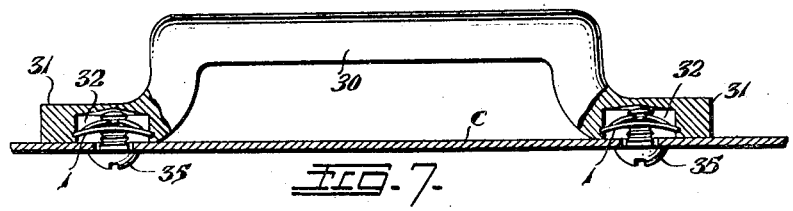
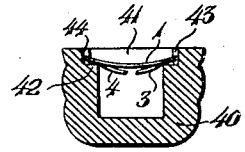
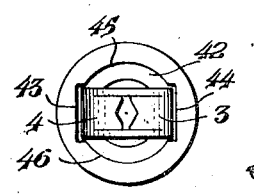
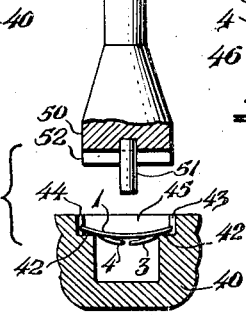
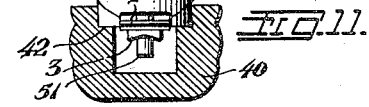
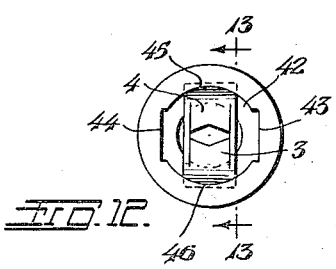
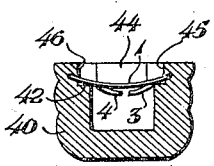
Inventor:
GEORGE A. TINNERMAN
H. S. Lombard
Attorney Patented Mar. 4, 1941

2,234,097

UNITED STATES PATENT OFFICE 2,234,097

ATTACHING KNOBS, HANDLES, AND THE LIKE

George A. Tinnerman, Rocky River, Ohio, assignor, by mesne assignments, to Tinnerman Products, Inc., Cleveland, Ohio, a corporation of Ohio Application September 21, 1938, Serial No. 231,050

9 Claims. (Cl. 16—110)

This invention relates generally to an improved attaching means for knobs, handles or like parts and deals, more particularly, with such articles formed of hardened plastic material molded or otherwise formed into any selected design or configuration with due provision for simple, inexpensive securing means for mounting the same onto a supporting part in a positive, permanent manner to serve their usual purpose and otherwise embellish the exposed surface of such supporting part and create a novel and artistic appearance.

It is a primary object of this invention to provide an improved means for attaching a knob, handle or like part by a bolt or screw fastening and which overcomes all the foregoing insufficiencies of the prior art by eliminating the necessity for special thread forming operations in providing an assembly which is simple, most inexpensive, extremely light in weight, and easily and quickly embodied in almost any installation of the class described.

Another object of this invention is for the provision of a trim handle, knob or like installation comprising a hardened plastic or like part provided with simple, inexpensive attaching means in the form of a relatively small section of sheet metal seated in anchored engagement in a hole provided in such part and provided with means adapted to threadedly engage a bolt or screw fastening for mounting the same onto a supporting structure.

Still another object contemplates the provision of such a mounting for a knob, handle or like part by an arrangement in which the attaching means is entirely concealed from view in the completed installation.

A further object is to provide a mounting for plastic trim handles, knobs and the like, held in permanent, positive position by securing means simplifying the assembly thereof onto a supporting surface and without the use of adhesives, cement or expensive fastenings such as threaded metallic inserts or elaborate clip devices.

A more specific object comprehends an attaching means for a knob, handle or like part comprising a simple, one-piece, sheet metal fastening anchored in such part and provided with integral bolt receiving means struck and formed therefrom adapted to engage a threaded member in the manner of a self-locking nut thereby enabling the positive, rigid attachment of knobs and handles by means of ordinary screws and bolts without the use of inserts, threaded nuts or lock washers of any kind.

A further object contemplates the provision of an attaching means for mounting a trim object onto a cooperating supporting part, the said attaching means comprising a simple, inexpensive sheet metal attaching plate device rigidly and positively assembled in a hole formed in the object to be mounted and provided with integral bolt engaging means struck and formed therefrom adapted to engage a threaded fastening in the manner of a self-locking nut to rigidly and positively secure said object to the supporting part under spring tension.

A still further object is to provide an attaching means for a hardened plastic trim handle, knob or like object comprising a sheet metal attaching plate provided with yieldable bolt engaging elements to which individual threaded fastening devices may be readily applied and drawn taut to mount the object rigidly and securely onto a supporting part under continuously effective spring holding action without subjecting the supporting part to such bending stresses and strains as will crack and enamel finish surface thereon.

Further objects and advantages of the invention, and other new and useful features in the construction, arrangement and general combination of parts will be apparent to those skilled in the art as a description thereof proceeds with reference to the accompanying drawing in which like reference characters designate like parts throughout the same, and in which:

Fig. 1 is a vertical section through a form of knob device showing the improved arrangement by which the attaching plate may be assembled and securely held therein preparatory to mounting the assembly onto a supporting surface by a cooperating threaded fastening;

Fig. 2 is a similar view illustrating the method of mounting the knob assembly of Fig. 1 by a bolt fastening spot welded to an imperforate enamelled supporting surface;

Fig. 3 is a sectional view of Fig. 2 taken on line 3—3 looking in the direction of the arrows;

Fig. 4 is a perspective of the sheet metal attaching device per se;

Fig. 5 represents a mounting for a handle the connecting hub portions of which are shown in section to illustrate the application and use of the attaching plate in such an assembly;

Fig. 6 is a section of Fig. 5 taken along line 6—6 looking in the direction of the arrows;

Fig. 7 shows another form of handle mounting in which the handle comprises relatively thin connecting flanges provided with the improved attaching means;

Figs. 8–12 inclusive disclose an alternate form of the attaching means comprising a special hole or socket arrangement in which the sheet metal attaching plate is seated and rotated to locked anchored engagement in the part to be mounted, Fig. 8 illustrating the attaching plate as initially applied to the hole in a knob, shown in section;

Fig. 9 is a top plan view of the structure illustrated in Fig. 8;

Fig. 10 is a view similar to Fig. 8 showing a tool about to be applied to the attaching plate seated in the hole provided in the knob;

Fig. 11 shows the tool as applied preparatory to rotating the same to cause the attaching plate to cut a groove and become positively anchored in the material of the knob;

Fig. 12 is a top plan of the assembly showing the attaching member as anchored in the material of the knob; and, Fig. 13 is a sectional view taken on line 13—13 of Fig. 12 looking in the direction of the arrows.

The use of the attaching means of the present invention makes for an important advantage in that there is a considerable saving in the amount of material required in the formation of a plastic part inasmuch as such part is necessarily molded in substantially hollow form to provide the required hole or recess for seating the sheet metal attaching plate device and receiving the stud fastening threadedly engaged therewith.

For purposes of illustration, the invention is shown in connection with knob and handle devices such as may be used on utility cabinets, kitchen utensils and the like but it is to be understood that the improved attaching means is not limited to the types of devices illustrated and described since the invention is equally adaptable to use as a fastening means for securing or mounting many other objects such as structural parts and other articles of manufacture.

Referring now, more particularly, to the drawing, Figs. 1 to 3 inclusive show a preferred embodiment of the invention comprising a substantial knob device attached to any suitable supporting part such as sheet metal wall A having, for example, an enamelled finish surface a. The knob device 10 is preferably in the form of a one-piece accessory provided from any suitable material such as hardened plastic compositions, vulcanized fibre, hardwood, etc. and may assume any desired shape or configuration so long as due provision is made for a relatively large hole or cavity 11 for receiving the attaching member comprising a sheet metal locking plate 1, Fig. 4, and the cooperating stud member applied thereto.

The hole is provided either in the molding operation or by successive drilling operations in the manner of a stepped recess comprising a countersunk area 12 presenting a shoulder 13 merging into a bore or other suitable stud receiving portion 14. By this arrangement, the countersunk portion 12 is admirably suited for receiving the sheet metal attaching member and seating the same positively against the shoulder 13 in substantially locked, positive embedded fastening engagement therewith as shown in Fig. 1.

The attaching member may be provided in the form of a triangular, rectangular or other polysided sheet metal section in which the pointed corners presented by the intersecting sides of the section form substantial prongs suitably spaced for anchoring the attaching member in assembled relation in the recess formed in the plastic part or the like. However, as shown in Fig. 4, the attaching plate device is more advantageously provided in the manner of a simple, rectangular section which may be produced inexpensively without loss or waste of material whatsoever from any selected sheet metal strip stock, preferably spring steel or cold rolled metal. The locking plate thus obtained to serve as the attaching member comprises end and bridge portions between which integral tongues 3, 4 or similar bolt engaging means are deformed, extruded or struck and formed, to project out of the plane thereof for threadedly engaging a bolt or screw fastening substantially in the manner of a nut. The said end and bridge portions provide, what may be termed, the body of the locking plate, which body is so formed in the stamping operation as to present a generally concave base from which the tongues extend upwardly in substantial ogee formation with the extremities thereof so spaced as to lie on a helix corresponding substantially to the pitch of the threads of the bolt fastening for most effective, uniform threaded engagement therewith. And inasmuch as the locking plate is dished or arched, its corners 2 are exposed toward the underside thereof in the manner of substantial prongs adapted to serve as anchoring means to become embedded in the side walls of the recess provided in the plastic part or the like on being applied thereto as presently to be described.

Referring to Figs. 1 and 3 it will be understood that the attaching plate device thus provided is designed with its corner prongs 2 spaced apart when normally untensioned, a distance slightly greater than the size of the countersunk recess portion 12 of the knob. Accordingly the attaching plate device may be easily and quickly assembled in such recess simply by applying suitable pressure to flex the generally concave base thereof sufficient to permit the corners to slide along the side walls of the countersunk recessed portion 12 until firmly seated against the shoulder 13. Upon release of pressure at such point, the generally concave base, of course, tends to flatten and otherwise assume its normal untensioned configuration whereby such corner prongs not only positively engage the side walls of the recess to be retained against loosening or reverse movement but also dig into and become embedded in the material of such part in substantial anchored engagement therewith.

With the locking plate assembled in anchored engagement with the knob or like part, the mounting of such part onto the supporting surface is accomplished by the use of any suitable bolt or screw fastening adapted to threadedly engage with the integral bolt engaging means 3, 4 of the attaching member. Thus as shown in Fig. 2, in a preferred construction, a common bolt fastening 8 is united to the enamelled wall surface A in any suitable manner as by spot-welding W whereupon the knob may be readily attached thereto by rotary movement to threadedly engage the bolt receiving means 3, 4, of the attaching member with the bolt fastening which is fully received in the hole in the knob and entirely concealed in the completed installation thereby adding to the effectiveness of the appearance and design of the knob mounting.

The integral bolt receiving means 3, 4 in the attaching member 1 may, of course, be provided in any other suitable form or construction depending on the strength required and the use to which the device is put, so long as the elements thereof threadedly engage with the bolt fastening as it is drawn up. However, it has been found that such bolt receiving means prepared in the form of cooperating tongues, as shown, are the most efficient and most practical in that they are possessed of unusual inherent strength and will not collapse or pull through on tightening of the bolt nor loosen from fastening engagement under constant strain, heavy usage and rough handling of an installation in which they are used. This is possible by reason of the fact that such tongues tend, more effectively, to move toward each other and dig into the grooves intermediate adjacent threads on tightening with the bolt or screw and thereby become embedded in the root diameter of such threaded member in locked, frictional fastening engagement therewith. Thus, any vibration, jarring or strain taking place in a completed mounting cannot cause displacement, reverse rotation or tend toward unscrewing of the bolt or screw fastening from applied position. It will therefore be appreciated that in the provision of such integral bolt receiving means in the locking plate or attaching member, the use of individual threaded nuts or lock washers of any kind is entirely dispensed with thereby making for a considerable saving not only in the cost of such nuts and lock washers, but also materially reducing the expense and labor involved in the tedious time consuming assembling operations which such fastenings require.

In tightening the mounting to rigidly secure the knob or like part to the wall member, it is to be noted that the extremities of the knob bear directly on the sheet metal wall member A, and in the event such wall member is provided with an enamelled finish surface such an arrangement would appear objectionable since cracking and chipping of the enamel could easily take place incident to bearing stresses set up on tightening of the bolt fastening with the bolt engaging means of the attaching plate. However, inasmuch as such attaching members are constructed of sheet metal and preferably spring steel with the bolt engaging means thereof provided in the form of yieldable tongues, the connection is yieldable not only in the generally concave body portion of the attaching member but also in the area of the integral yieldable tongues and thus on tightening of the mounting, the connection may give and yield and thereby prevent damaging bending stresses from being transmitted to the wall member such that possibility of cracking or chipping of the enamel finish surface is greatly minimized and in many installations completely eliminated.

Figs. 5 and 6 show a modified arrangement of the attaching means for mounting a handle 20 or the like comprising substantial connecting hubs 21 at either end thereof. The cross section of such hub is usually of greater length than width and accordingly, it is most expedient to form the countersunk shouldered portion 23 of the fastener receiving hole of substantially rectangular shape with the corner areas thereof, Fig. 6, somewhat rounded or flattened to present suitable corner side walls into which the corner prongs 2 of the sheet metal attaching member may embed. The interior of the hole may be of any suitable contour so long as it is of sufficient depth to receive the shank of the associated bolt fastening and includes a shoulder 24 against which the attaching member may seat in assembled relation therewith.

The attaching plate device is of the same general character as described with reference to Figs. 1 to 4 inclusive and of suitable rectangular configuration to be received in the rectangular countersunk portion 23 of the hole but is slightly greater in length than such countersunk portion when normally untensioned. Thus the attaching plate may be assembled in the hole in the connecting hub by flexing the generally concave base thereof under pressure until the same is seated firmly against the shoulder 24 in which position pressure is removed permitting the corner prongs 2 to embed in the corner portions of the side walls of the countersunk portion 23, Fig. 6, in substantially locked, anchored engagement therewith. Accordingly, with the hubs provided with attaching plate devices in this manner, the handle may be readily mounted by suitable bolt fastenings 25 passing through passages provided in the wall member B to threadedly engage the bolt engaging elements 3, 4 of the attaching plates in effective locked fastening engagement therewith substantially as described with reference to the embodiment of the invention shown in Figs. 1 to 4 inclusive.

In Fig. 7 there is shown a mounting for a handle 30 comprising one or more connecting flanges 31 of comparatively thin cross-section and usually of insufficient thickness to receive a metallic insert or similar fastening without being exposed. In this relation, the hole 32 in the connecting flange may assume nothing more than a simple bore extending only partly through the flange thickness such that the attaching member, being merely a thin sheet metal section, is readily assembled in such hole with due provision for receiving the shank of the bolt fastening applied thereto. This is accomplished by means of a simple push-type tool for applying the attaching member only substantially midway of the length of the hole and in suitable spaced relation from the bottom wall of the recess where the corner prongs thereof become embedded in anchored engagement with the side walls of the recess under tension substantially in the manner described with reference to the form of the invention illustrated in Figs. 1 to 4 inclusive. The handle thus provided with the attaching plate devices may then be mounted to a wall surface C by suitable bolt fastenings 35 threadedly engaged with the bolt engaging elements thereof to provide an extremely useful form of mounting in which the attaching means is entirely concealed in a completed installation. In this respect, it will be recognized that the fastening arrangement just described is admirably suited for securing any relatively thin part such as wall board, moldings and other finishing objects wherein it is necessary or desirable that the attaching means be unexposed to view.

Figs. 8 to 13 inclusive disclose another arrangement for anchoring the sheet metal attaching plate device in assembled relation in a hole provided in a knob, handle or other part to be mounted onto a supporting surface. Generally, this embodiment of the invention contemplates a structure in which the sheet metal attaching plate is forced into positive engagement with the part to be secured by means of substantial relative turning movement causing the corner prongs of the plate to cut a groove in the side walls of a hole provided in such part and otherwise dig into and become embedded in the material thereof in firm, rigid anchored engagement therewith.

Such grooving to anchor the attaching plate is readily accomplished by reason of the fact that many plastic compositions and like parts are comparatively soft wherefore the sharp edges of the thin sheet metal attaching plate are easily forced to cut into and become embedded in the material of such part as necessary or desired.

As best seen in Figs. 8 and 9, the hole provided in the knob 40 or other part to be secured comprises the usual countersunk portion 41 presenting a shoulder 42. The said countersunk portion however, is of less diameter than the overall length of the attaching plate but includes opposed recesses 43, 44 for receiving the extremities of the attaching plate, Fig. 9, to permit the same to seat against the said shoulder 42 in the initial assembly thereof as shown in Fig. 8. The attaching plate is then forced by relative turning movement from this initial assembled relation, to positive anchored engagement in the hole by causing the corner prongs thereof to cut a groove in the side wall portions 45, 46 of the hole and otherwise become embedded in the material adjacent the hole substantially as shown in Figs. 12 and 13.

A preferred form of tool which may be employed for this purpose is shown in Figs. 10 and 11 and comprises a head 50 designed to be fully received in the countersunk portion 41 of the hole together with the pilot 51 facilitating application of the tool in operative position with the attaching plate as illustrated in Fig. 11. The tool head includes a pair of spaced jaws 52, 53 designed to straddle the attaching plate when applied thereto as shown in Fig. 11 and otherwise engage the edge surfaces thereof upon turning movement of the tool through substantially ninety degrees or less as desired thereby causing the corner prongs of the attaching plate to cut a groove in the adjacent material of the side walls 45, 46, surrounding the hole. The attaching plate is thus embedded in firm rigid anchored engagement with the part to be secured substantially as shown in Figs. 12 and 13 whereupon such part may be easily and quickly mounted in an installation by a suitable bolt fastening applied to the integral bolt engaging elements 3, 4 of the attaching plate substantially in the manner of the previously described forms of the invention.

While this invention has been described in detail with specific examples such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In a mounting for a hardened plastic object to be secured to a supporting part, attaching means comprising a resilient sheet metal section assembled in a smooth-wall hole provided in said object, said sheet metal section being provided with fastener engaging means and anchoring means, said anchoring means being spaced apart a distance greater than the size of the hole when the resilient sheet metal section is normally untensioned, whereby said resilient sheet metal section is adapted to be flexed on being assembled in said hole to dispose said anchoring means thereof in embedded engagement with the side walls of said hole in providing a substantially locked rigid assembly of the sheet metal section with the object to be secured, said fastener engaging means of the sheet metal section receiving a co-operating fastener securing said object to the supporting part.

2. In a mounting for a hardened plastic object to be secured to a supporting part, attaching means comprising a resilient sheet metal attaching plate assembled in a smooth-wall hole provided in said object, said attaching plate being provided with fastener engaging means and anchoring prongs presented by corner portions of said attaching plate, said anchoring prongs being spaced apart a distance greater than the size of the hole when the resilient attaching plate is normally untensioned, whereby said resilient attaching plate is adapted to be flexed on being assembled in said hole to dispose said anchoring prongs thereof in embedded engagement with the side walls of said hole in providing a substantially locked rigid assembly of the attaching plate with the object to be secured, said fastener engaging means of the attaching plate receiving a cooperating fastener securing said object to the supporting part.

3. In a mounting for a hardened plastic object to be secured to a supporting part, attaching means comprising a resilient sheet metal section assembled in a smooth-wall hole provided in said object, said hole having a shoulder spaced from the open end thereof, said sheet metal section being provided with fastener engaging means and anchoring means, said anchoring means being spaced apart a distance greater than the size of the hole when the resilient sheet metal section is normally untensioned, whereby said resilient sheet metal section is adapted to be flexed on being applied to seat on said shoulder in the hole and dispose said anchoring means thereof in embedded engagement with the side walls of said hole in providing a substantially locked rigid assembly of the sheet metal section with the object to be secured, said fastener engaging means of the sheet metal section receiving a co-operating fastener securing said object to the supporting part.

4. In a mounting for a knob, handle or other object to be attached to a supporting part, said object having a hole including a side recess, an attaching device comprising a sheet metal section provided with bolt engaging means, said section being applied to assembled relation in said hole with a portion thereof received in said recess and subjected to turning movement relative to the object to dispose said section in anchored relation in said hole thereby providing a substantially locked rigid assembly of the sheet metal section with the object to be attached, said bolt engaging means of the sheet metal section receiving a fastening for securing said object to the supporting part.

5. In a mounting for a knob, handle or other object to be attached to a supporting part, said object having a hole including a shoulder and side recesses, an attaching device comprising a sheet metal section provided with bolt engaging means, said section being seated against said shoulder in the hole with the extremities thereof received in said recesses and subjected to turning movement relative to the object thereby disposing said extremities in embedded relation with the side walls of said hole, whereby a substantially locked rigid assembly of the sheet metal section with the object to be attached is provided, said bolt engaging means of the sheet metal section receiving a fastening for securing said object to the supporting part.

6. In a mounting for a knob, handle or other object to be attached to a supporting part, said object having a hole including opposed side recesses, an attaching device comprising a sheet metal section provided with bolt engaging means and anchoring prongs, said section being seated against said shoulder in the hole with said anchoring prongs received in said recesses and subjected to turning movement relative to the object thereby disposing said anchoring prongs in embedded relation with the material of the side walls of said hole, whereby a substantially locked rigid assembly of the sheet metal section with the object to be attached is provided, said bolt engaging means of the sheet metal section receiving a fastening for securing said object to the supporting part.

7. In a mounting for a handle or other object to be attached to a supporting part, attaching means comprising an attaching plate assembled in a substantially rectangular shaped hole provided in said object, said attaching plate being of generally rectangular configuration to conform to said hole and slightly greater in length when normally untensioned, said attaching plate being provided with bolt engaging means and anchoring prongs presented by the corner portions thereof, said attaching plate being seated in said hole under tension to dispose said anchoring prongs in embedded relation in the corner portions of the side walls thereof to provide a substantially locked rigid assembly of the attaching plate with the object to be attached, said bolt engaging means of the attaching plate receiving a fastening for securing said object to the supporting part.

8. In a mounting for an object to be secured to a supporting part, attaching means comprising a resilient sheet metal section assembled in a hole provided in said object, said sheet metal section being provided with fastener engaging means and anchoring means, said section being adapted to be received in said hole with said anchoring means thereof in embedded engagement with the walls of said hole and subjected to turning movement relative to the object to dispose said section in anchored relation in said hole, thereby providing a substantially locked rigid assembly of the sheet metal section with the object to be secured, said fastener engaging means of the sheet metal section receiving a cooperating fastener securing said object to the supporting part.

9. In a mounting for an object to be secured to a supporting part, attaching means comprising a resilient sheet metal attaching plate assembled in a hole provided in said object, said attaching plate being provided with fastener engaging means and anchoring prongs defined by corner portions of said attaching plate, said attaching plate being adapted to be received in said hole with said anchoring prongs thereof in embedded engagement with the walls of said hole and subjected to turning movement relative to the object to dispose said attaching plate in anchored relation in said hole, thereby providing a substantially locked rigid assembly of the attaching plate with the object to be secured, said fastener engaging means of the attaching plate receiving a cooperating fastener securing said object to the supporting part.

GEORGE A. TINNERMAN.